United States Patent [19]

Kimura et al.

[11] 4,102,813

[45] * Jul. 25, 1978

[54] CATALYST FOR PURIFYING EXHAUST GASES

[75] Inventors: Sadahiro Kimura; Kiyoshi Uchida; Hiroyuki Akizuki, all of Toyota, Japan

[73] Assignee: Toyota Jidosha Kogyo Kabushiki Kaisha, Toyota, Japan

[ * ] Notice: The portion of the term of this patent subsequent to Aug. 2, 1994, has been disclaimed.

[21] Appl. No.: 568,549

[22] Filed: Apr. 16, 1975

[30] Foreign Application Priority Data

Apr. 22, 1974 [JP] Japan .......................... 49-04529

[51] Int. Cl.$^2$ ............................................. B01J 31/02
[52] U.S. Cl. .................................. 252/430; 252/438; 252/440; 252/441; 252/463; 252/466 J; 252/466 PT; 423/213.5
[58] Field of Search ............... 252/438, 430, 440, 441, 252/466 B, 466 J, 466 PT, 463; 423/213.5

[56] References Cited

U.S. PATENT DOCUMENTS

| | | | |
|---|---|---|---|
| 2,422,172 | 6/1947 | Smith | 208/135 |
| 2,474,440 | 6/1949 | Smith et al. | 252/466 B X |
| 2,871,201 | 1/1959 | Doumani | 252/440 |
| 2,927,088 | 3/1960 | Michalko | 252/430 |
| 2,927,903 | 3/1960 | Nixon | 252/438 |
| 3,009,885 | 11/1961 | Bertolacini | 252/441 |
| 3,147,229 | 9/1964 | Hinlicky et al. | 252/441 X |
| 3,243,387 | 3/1966 | Blume et al. | 252/466 B |
| 3,392,125 | 7/1968 | Kelly et al. | 252/461 |
| 3,397,154 | 8/1968 | Talsma | 252/466 B X |
| 3,437,427 | 4/1969 | Quesada | 252/466 B X |
| 3,487,010 | 12/1969 | Buss | 252/466 B X |
| 3,775,300 | 11/1973 | Hayes | 252/466 B X |
| 3,849,336 | 11/1974 | Lloyd | 252/438 |
| 3,898,183 | 8/1975 | Sugier | 252/466 B X |

*Primary Examiner*—A. Winston Douglas
*Assistant Examiner*—John F. Niebling
*Attorney, Agent, or Firm*—Brisebois & Kruger

[57] ABSTRACT

A catalyst for purifying exhaust gases, comprising a carrier composed mainly of active alumina, containing near its surface a component to promote the transformation of active alumina to α-alumina when said carrier is subjected to a heat treatment in order to make the diameters of the pores near its surface larger than those of the pores in its interior, impregnated with an active catalytic component which permeates further into a portion of the interior deeper than the layer having the alumina transformation-promoting component.

10 Claims, 2 Drawing Figures

CATALYST FOR PURIFYING EXHAUST GASES

BACKGROUND OF THE INVENTION

Legal regulations have now been imposed with respect to the problem of air pollution, and this problem is of great importance all over the world. There are many sources of this air pollution, and one of them is the exhaust gas from engines. This gas contains carbon dioxide and water vapor, which are the products of complete combustion, and nitrogen, which originates from air introduced into the combustion chamber. It is known that combustion in an engine using a hydrocarbon fuel is an incomplete combustion, regardless of whether the engine is of the internal combustion type or of another type. For instance, exhaust gas coming from an automobile engine contains components regarded as direct or indirect poisons, such as carbon monoxide, unburnt hydrocarbons, nitrogen oxides and the like.

Carbon monoxide is poisonous and colorless and is substantially odorless. Accordingly, it can hardly be detected by the human body. Hydrocarbons per se are less poisonous, but they react with components contained in air and bring about substantial air pollution.

Therefore, since the appearance of automobiles, various efforts have been made to render the exhaust gas from an engine non-toxic. One of these is a method using a catalyst device for purifying exhaust gases. Catalysts to be used for such a device encounter the following problems. Firstly, exhaust gas from an engine varies greatly as to the harmful substances which it contains, the exhaust gas temperature, the flow rate and the like, depending on the engine operating conditions, and it is difficult to establish typical exhaust gas conditions; therefore, the catalysts should have a sufficient activity under a broad range of conditions.

Secondly, since the combustion temperature in an engine rises above 800° C, the catalysts to be used are required to be such that any reduction in their activity at high temperatures is kept low.

When a catalyst device of this type is used for automobiles, the conversion of harmful substances from the engine to harmless substances should be effected before the exhaust gas is discharged into the open air from an automobile. Therefore, catalysts should have sufficient strength to resist break-up when subjected to vibration during running.

Compounds of lead, sulfur, phosphorus and the like are included in fuels for automobile internal combustion engines, and hence, compounds of lead, sulfur and phosphorus exist in an exhaust gas as a matter of course. Furthermore, phosphorus compounds are contained in lubricating oils for internal combustion engines. Since a lubricating oil is often burnt in an internal combustion engine, components originating from the lubricating oil are contained in the exhaust gas. Among these compounds in exhaust gases, the compounds of lead, sulfur and phosphorus are generally harmful to the catalysts. Therefore, the catalysts should have a sufficient resistance to these harmful substances, which are known as "catalyst poisons".

In general, the mechanical resistance and resistance to catalyst poisons in exhaust gases are greatly influenced by the carriers used for the catalyst for purifying exhaust gases, and the heat resistance of the catalyst is greatly influenced not only by the carrier but also the active catalytic component, namely the catalytic metal component.

However, catalysts for purifying exhaust gases which have a sufficient mechanical strength and a sufficient resistance to catalyst poisons have not been easily found.

SUMMARY OF THE INVENTION

This invention relates to a catalyst for purifying exhaust gases, and more particularly, to a catalyst for purifying exhaust gases which has a high mechanical strength and a sufficient resistance to catalyst poisons, comprising a catalyst carrier composed mainly of alumina having components near its surface to promote the transformation of alumina to α-alumina, the alumina grains near the surface of the carrier have been enlarged to make the diameters of the pores near the surface larger those that of the pores deeper inside the carrier, while an active catalytic component has been impregnated deeper into the carrier than the layer having the alumina transformation promoting compound.

DETAILED DESCRIPTION OF THE INVENTION

Figure 1:
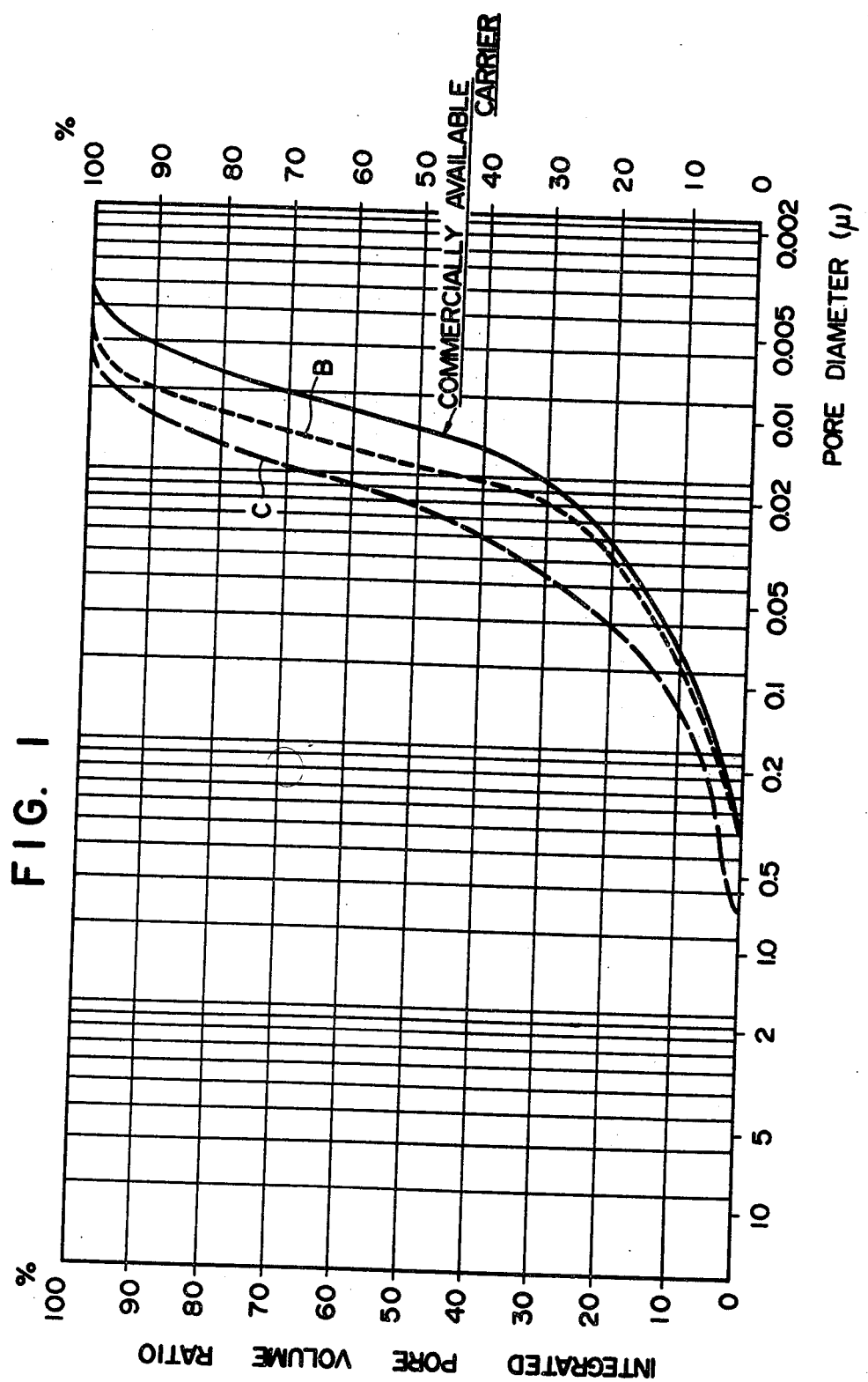
FIG. 1 illustrates the relationship between the integrated pore volume ratio and the pore diameters of the carrier used in Example 1 and catalyst of Reference Examples 1 and 2. The curve A shows the pore size distribution of the commercial carrier used in Example 1, the curve B the pore size distribution of the catalyst of Reference Example 1, and the curve C the pore size distribution of the catalyst of Reference Example 2.

Active alumina has heretofore been used mainly as a granular carrier for purifying engine exhaust gases such as automobile exhaust gases. This invention relates to a catalyst carrying an active catalytic component utilizing an alumina carrier having a special structure.

Various proposals have heretofore been made for a catalyst for purifying exhaust gases, and for carriers and active alumina to be used for such a catalyst, but none of them have completely solved the above-mentioned problems.

In the specification of U.S. Pat. No. 2,422,172, the patentees state that oxides of Cr, Mn, Fe, Mo and Co promote the thermal conversion of γ-alumina to α-alumina, and they propose that, in order to prevent this tendency of converting active aluminas to a much higher density phase, active aluminas be reacted with a certain type of alkaline earth metal compound. A number of similar proposals and research studies have heretofore been made. For example, Japanese Patent Applications laid open to the public under the numbers 14600/73 and 17467/73 disclose that changing aluminas to a higher density phase by thermal transformation can be prevented by reacting active aluminas with a certain kind of rare earth metal compound.

When such components as described above, e.g. Fe, Cr, or the like, are added to the carrier and grain growth is promoted by heat treatment, for example, when an iron component is impregnated into the carrier, the pore diameters of the alumina carriers is made considerably larger and hence, the tendency toward reduction of the compression strength becomes greater and the problem of loss of durability, especially mechanical strength, arises.

On the other hand, when the conversion of aluminas to a higher density phase is prevented by the addition of an alkaline earth metal compound or a rare earth metal compound, any reduction of the compression strength is small.

However, if a carrier to which a component as mentioned above is added or a carrier in which the mechanical strength is improved by reducing the pore diameters of the alumina is used as a catalyst for purifying automobile exhaust gases, the reduction in catalytic activity is generally greater than with a carrier having poor mechanical strength, i.e., a carrier having a larger pore size distribution. As a result of our detailed and extensive research, it has been found that this reduction in catalytic activity, hereinafter referred to as "degradation", is caused by catalyst poisons contained in the exhaust gas, such as mentioned above.

Accordingly, in order to improve the mechanical strength of the carrier, it has been necessary to employ a carrier composed of fine alumina grains. If such alumina is employed, since it also implies that the specific surface area of the alumina carrier becomes larger, it improves the dispersion of the metallic component to be carried and the durability of the catalyst can be improved. However, as mentioned above, this type of catalyst is subject to severe reduction in its catalytic activity due to catalyst poisons which have a harmful action to the catalysts.

As a result of our research on catalysts for purifying exhaust gases, it has been concluded that in order to obtain a catalyst having a sufficient mechanical strength and a high resistance to catalyst poisons such as mentioned above, the addition of a component which facilitates the thermal conversion of an alumina carrier to a higher density phase, and the use of an alumina carrier having a larger pore size distribution near its surface than in its interior, due to prior heat treatment, is very effective.

In this invention, an iron compound is used for making the pore diameters larger near the surface, but even when other components promoting the transformation of active alumina to $\alpha$-alumina, such as Cr, Mn and Cu, are used, a carrier according to the present invention will be obtained. The present inventors use iron because it is cheap, the risk of secondary pollution is small, and the transformation-promoting effect of alumina is high.

As the first step in completing this invention, i.e., the step of obtaining a very effective carrier in which the pore diameters near its surface are larger than in its interior, due to the growth of the grains of alumina near the surface, an iron compound is incorporated near the surface of the carrier and the alumina carrier is heat-treated under such conditions as to effect the transition iron compound-containing layer of the alumina to $\alpha$-phase, whereby the growth of alumina grains near the surface is promoted and a layer having large diameter pores is formed.

The depth of a carrier in which an iron compound is impregnated, that is, the thickness of a layer having larger diameter pores near the surface of the carrier is preferred to be less than 250$\mu$ although it differs one from the other according to the size and kind of the carrier. If made deeper than 250$\mu$, the catalyst content to be carried by the carrier amounts to a great quantity, thereby causing it to be uneconomical. Further, catalytic action takes place near the surface of a carrier and from this fact, it is unnecessary to make the layer thicker. The thickness of the layer is preferably 20 – 200$\mu$, and more preferably 80 – 160$\mu$.

There are various methods for making the iron compound be contained near the surface of the alumina, or of a carrier composed mainly of alumina. For example, the intended carrier can easily be obtained by contacting the carrier to be impregnated with a solution suitable for facilitating the deposition of an iron compound in the carrier, such as aqueous ammonia or a solution containing a hydroxide, e.g., NaOH, KOH, and BaOH, a carbonate, e.g., $Na_2CO_3$ and $NaHCO_3$ or a sulfide, e.g., $(NH_4)_2S$ and $H_2S$, or the carrier dried if necessary with a solution containing an iron compound.

Any of the iron compounds that can be deposited near the surface of the carrier can be used in this invention. For example, mineral acid salts such as iron nitrate and iron sulfate, and iron chloride, double salts such as Mohr's salt and iron alum, and other organic acid salts such as iron acetate can be used.

The above-mentioned method is one of the various methods that can be adopted for introducing an iron compound near the surface of the carrier, but an impregnation method is also an effective method for attaching an iron compound near the surface of the carrier.

In this invention, a carrier, near the surface of which an iron compound has been introduced in accordance with the above-mentioned method or some other effective method, is used after being heat-treated under such conditions as to effect the transformation of alumina in the layer having the iron compound to its $\alpha$-phase, whereby the pore diameters near the carrier is made larger.

The second step in this invention is to add to the carrier produced in the above manner, the palladium component which constitutes the catalytic component in the form of metallic palladium or palladium oxides.

This may be done by permeating the carrier with a solution containing a palladium compound and subjecting it to a suitable treatment as necessary.

Suitable palladium compounds for use in the solution, include palladium halides, mineral acid salts such as nitrates, and complex salts with ammonia, amine or the like, organic acid salts such as palladium acetate, and chelate compounds. These palladium compounds may be used singly or in the form of a mixture of two or more of them.

The amount of palladium or palladium compound to be carried can be normarlly the same as that to be carried in an alumina carrier. Although it depends on the kind of alumina to be used, it is preferred that palladium is used in the amount of more than 0.01%, preferably 0.1–0.2%.

Among the "suitable treatments" referred to in this invention are washing, chemical treatment, drying, heat treatment and the like.

Washing is generally performed by using water or warm water. For example, in case an acid is present in the solution containing the palladium compound, a washing liquid containing ammonia, caustic soda or the like can be used for removal of the acid. It is also possible to use a washing liquid containing an acid or salt. In case subsequent dryings is necessary, it is possible to use a volatile washing liquid such as acetone, alcohols and ethers.

The chemical treatment is generally conducted as a means for activating the catalytic component or promoting the activation of the catalytic component. By the "chemical treatment" referred to in this invention is meant a treatment for converting a part or all of the catalytic component contained in the carrier into the metal itself or another metal compound. For instance, a reducing treatment using a reducing agent such as formalin, hydrazine, formic acid, aldehydes, $NaBH_4$, $LiAlH_4$ or the like, alkali metal salts such as NaOH, KOH, $Na_2CO_3$, $NaHCO_3$, $CH_3COONa$ and an anion-exchange treatment using various acids, or a treatment forming a complex compound with ammonia, an amine or the like are employed.

The resulting catalyst can be applied to practical use. However, if the catalyst is to be utilized effectively, some problems arise. One of these is the influence of the iron compound in the carrier on the catalytic palladium component. More specifically, if calcination after the introduction of the iron compound is insufficient, the initial activity of the catalyst and heat resistance of the catalyst deteriorate as compared with a catalyst free of the iron compound.

This invention will now be explained in greater detail by reference to the following Examples, but they by no means limit the scope of this invention.

EXAMPLE 1

Commercially available active alumina (a product of Sumitomo Chemical Co., Ltd. composed mainly of χ-alumina) was immersed in 0.2-N aqueous ammonia, and after sufficient permeation of the solution into the carrier, the excess solution was removed and the carrier was dipped for 5 minutes in an aqueous solution containing 0.2 mole/l of ferrous chloride, washed with water, and dried at 120° C. Then, the carrier was heat-treated at 900° C for 5 hours. The resulting carrier is designated as "carrier A". This carrier A was immersed for 20 minutes in an aqueous solution of palladium nitrate, acidified with nitric acid containing 2 g/l of palladium.

Then the excess solution was removed and the carrier was heat-treated at 600° C for 2 hours, to obtain the catalyst. The resulting catalyst is designated as "catalyst A". In this catalyst A, the layer containing the iron compound extends from the catalyst surface inwardly to a depth of about 120μ, and the layer impregnated with palladium component extends from the surface inwardly to a depth of about 200μ.

Catalysts B and C were prepared for comparison with catalyst A according to the methods described in the following Reference Examples 1 and 2.

REFERENCE EXAMPLE 1

Commercially available active alumina (the same as the alumina used in Example 1) was heat-treated at 900° C for 5 hours to obtain a carrier B. This carrier B was immersed for 20 minutes in an aqueous solution of palladium nitrate acidified with nitric acid, containing 2 g/l of palladium, the excess solution was removed, and the carrier was dried at 120° C and heat-treated at 600° C for 2 hours to obtain a catalyst B. In an X-ray diffraction test of the catalyst B, the presence of α-alumina was not observed.

REFERENCE EXAMPLE 2

Commercially available active alumina (the same as the alumina used in Example 1) was immersed for 1 hour in an aqueous solution containing 1 mole/l of ferric nitrate, the excess solution was removed, and the carrier was dried at 120° C and heat-treated at 900° C for 5 hours. This carrier is designated as "carrier C". The carrier C was immersed for 20 minutes in an aqueous solution of palladium nitrate, and acidified with nitric acid containing 2 g/l of palladium. The excess solution was removed and the carrier was dried at 120° C and heat-treated at 600° C for 2 hours to obtain a catalyst C. In this catalyst C, the layer containing the iron compound reached almost to the central portion of the carrier and the layer permeated with Pd component extended to a depth of about 200μ. In an X-ray diffraction test of the catalyst C, the presence of α-alumina was observed.

For the above carriers B and C and the carrier used in Example 1 (before treatment), the pore size distribution curve was determined by the mercury-pressing method. The results are shown in FIG. 1.

In FIG. 1, the ordinate indicates the integrated pore volume ratio (%) and the abscissa the pore diameters. The integrated pore volume ratio is calculated according to the following equation:

Integrated pore volume ratio = $V_p/V_t \times 100$ wherein $V_p$ denotes the volume (cc) of mercury compressed into the carrier up to each measurement point (each pore diameter) and $V_t$ the volume (cc) of mercury compressed into the carrier up to the end of the test.

From FIG. 1, it will be appreciated that the pore size distribution curve of the carrier C which is impregnated with iron compound and heat-treated shifts toward the large pore diameters side as compared with the carrier B which does not contain an iron compound and the commercial carrier used in Example 1, due to the effect of the iron compound.

The catalysts obtained in Example 1 and Reference Examples 1 and 2 were compared with each other with respect to the effects of the relationship between the layer permeated with Pd component and the layer containing the iron compound on the catalytic activity and crush strength. A propane oxidation test was used for the determination of the catalytic activity.

The propane oxidation test was conducted under the following conditions:

Space velocity: 18000 ml/hr.ml of the volume of the packed catalyst

Reaction furnace temperature: 400° C

Feed gas: 570 ppm of $C_3H_8$ and 1.2% of CO, the balance being air

Analytical apparatus: hydrocarbon analyzer

The propane conversion is calculated according to the following equation: Propane conversion (%) = $(A-B)/A \times 100$ wherein A stands for the initial concentration of propane and B for the residual propane concentration in gas which has passed through the catalyst bed maintained at about 400° C.

In this invention, the crush strength was measured in the following manner:

After the adjustment of catalyst grain size to 5 to 6 mesh, 20 grains were chosen from the catalyst grains. The two lowest values and two highest values were removed from the 20 measured values of the crush strength, and the arithmetic mean value of the remaining 16 values was calculated. A Kiya type hardness tester was used for the determination of crush hardness.

Table 1 shows the results of the measurements of the crush strength and of the propane-oxidizing activity before and after the heat resistance test, which was carried out by allowing these catalysts to stand in a muffle furnace at 1000° C for 5 hours. This test was carried out for each of the catalysts A, B and C.

TABLE 1

| Catalyst | crush Strength (Kg/grain) | Propane conversion (%) | |
|---|---|---|---|
| | | before heat resistance test | after heat resistance test |
| Catalyst A | 9 | 96 | 73 |
| Catalyst B | 11 | 96 | 71 |
| Catalyst C | 3 | 68 | 63 |

As is apparent from Table 1, in a catalyst in which the layer having the iron compound extends inward more deeply than the layer impregnated with palladium component (catalyst C), the initial propane conversion is much lower than that of a catalyst free from an iron compound (catalyst B). Thus, it will readily be understood that in the case of a catalyst of the type C, the presence of an iron compound has an undesirable influence on the catalytic activity of the palladium component. In contrast, when the palladium component carrying layer extends inwardly more deeply than the iron compound-containing layer (catalyst A), the catalyst has a catalytic activity substantially equal to the catalyst free from an iron compound. With respect to the crush strength, a catalyst in which an iron compound is present deeply therewithin is very disadvantageous.

From the foregoing, it will be understood that the catalyst in which the catalytic palladium component extends more deeply inward than the iron compound-containing layer is comparable to conventional catalysts with respect to its mechanical strength and heat resistance.

Thus, FIG. 1 shows that the catalytic activity is greatly influenced by the relationship between the iron compound-containing layer and the palladium component carrying layer. As stated above, the mechanical strength of the catalyst is influenced by the conditions employed for the heat treatment of the iron compound-containing carrier, the iron compound content, the distribution of the iron compound-containing layer, and the like.

As a result of our extensive research, the present invention has been completed by the development of a catalyst carrier having sufficient mechanical strength, an improved resistance to catalyst poisons and an improved heat resistance. The catalyst carrier composed mainly of alumina containing an iron compound near its surface, is heat-treated under such conditions as to cause conversion of the alumina containing an iron layer into α-alumina, thereby increasing the sizes of the alumina grains near the surface as well as making the pore diameters near the surface larger than those inside the carrier, while the palladium component carrying layer of the alumina carrier extends more deeply into the carrier than the iron compound-containing layer.

Therefore, the characteristic feature of this invention is that a catalyst in which the problem of quality is solved and a sufficient purifying effect on exhaust gases is attained, is produced by employing a carrier prepared in the manner described above. The catalyst has a sufficient mechanical strength, no problem of heat resistance and an improved resistance to catalyst poisons, and the palladium component carrying layer in the carrier extends more deeply into the carrier than the iron compound-containing layer. In this invention, besides palladium, other elements of the platinum group such as Pt. Ru, Rh, Os or Ir can be used as the catalytic component.

Each of the above-mentioned steps can be carried out according to any of the above-mentioned methods, but it must be noted that each step should be carried out under such conditions that the palladium component carrying layer extends further into the carrier than the iron compound-containing layer.

Furthermore, in the catalyst of this invention, a representative catalytic component and a representative promoter component are palladium component and an iron compound respectively. An effective catalyst according to this invention may be produced by controlling the active catalytic component layer in order to utilize the catalytic components more effectively in the carrier. Next, the results of testing the catalyst A of this invention, as produced in Example 1, and the catalyst B as produced in Reference Example 1 for their resistance to catalyst poisons will now be described.

The accelerated catalyst poison test was conducted by using gasoline containing 0.6 grams per U.S. gallon of Pb and 0.10 grams per U.S. gallon of P in an actual engine. Test conditions are as follows:

Space velocity: 75000 - 90000 ml/hr.ml of the volume of the packed catalyst
Catalyst bed temperature: 800° C
Test time: 50 hours
Atmosphere: CO content of about 1.2% and a $CO/O_2$ ratio of 0.5 - 0.8

The results of the propane-oxidizing and CO-oxidizing tests conducted before and after the above accelerated catalyst poison test with respect to the catalyst A of this invention and the comparative catalyst B are shown in Table 2.

The CO-oxidizing test was conducted under the following conditions:

Space Velocity: 30000 ml/hr.ml of the volume of packed catalyst
Feed gas temperature: 275° C
Feed gas: 2.5% of CO and the balance being air
Analytical apparatus: CO tester
The CO purifying ratio is calculated according to the following equation: CO conversion (%) = (X-Y)/X × 100
wherein X is the initial CO concentration and Y the residual CO concentration when 8 minutes have passed since the start of the test.

TABLE 2

| | Propane conversion % | | CO conversion % | |
|---|---|---|---|---|
| | before poison resistance test | after poison resistance test | before poison resistance test | after poison resistance test |
| Catalyst | | | | |
| Catalyst A | 96 | 72 | 99 | 92 |
| Catalyst B | 96 | 43 | 99 | 67 |

From the above results, it will be clear that catalyst A of this invention represents a substantial improvement over comparative catalyst B with respect to the propane conversion and CO conversion after the accelerated catalyst poison resistance test.

When the results shown in Tables 1 and 2 are considered collectively, it is seen that the catalyst A of this invention is comparable to conventional catalysts with respect to its mechanical strength and heat resistance and that with the catalyst A of this invention, the problem of the poor resistance to catalyst poisons, which cannot be solved in conventional catalysts, can be effectively solved. In short, it will readily be understood that the catalyst according to this invention satisfies all the conditions required for a catalyst for purifying exhaust gases.

EXAMPLE 2

Commercially available alumina (a product of Rhone Prodile Co. composed mainly of γ-alumina) was immersed in 0.4-N aqueous ammonia containing 3% of hydrogen peroxide, and after the solution had sufficiently impregnated the carrier, the excess solution was removed and the carrier was immersed in an aqueous solution containing 0.5 mole/l of Mohr's salt (ammonium ferrous sulfate) for 5 minutes. Then, the carrier was washed with water, dried at 120° C, and heat-treated at 1100° C for 2 hours. The resulting carrier was immersed for 20 minutes in an aqueous solution of palladium chloride acidified with hydrochloric acid, containing 1 g/l of palladium. The excess solution was then removed and the carrier was treated with an aqueous solution containing 2 g/l of $NaBH_4$, washed repeatedly with water, dried at 120° C and heat-treated at 600° C for 30 minutes to obtain the catalyst. The resulting catalyst is designated as "catalyst D". In this catalyst D, the iron compound-containing layer extended inwardly from the catalyst surface to a depth of about 110μ and the palladium component carrying layer extended to an additional depth of about 50μ (a total depth of about 160μ from the catalyst surface).

EXAMPLE 3

A catalyst was prepared in the same manner as in Example 2 except that the normality of aqueous ammonia containing hydrogen peroxide was changed to 0.5-N. The resulting catalyst is designated as "catalyst E". In this catalyst E, the iron compound-containing layer extended inwardly from the surface to a depth of about 50μ and the palladium component carrying layer further extended additional 90μ.

Catalysts prepared by impregnating a carrier which did not contain the component promoting the phase transformation of active alumina with a catalytic active component, were also prepared according to the methods described in the following Reference Examples 3 and 4.

REFERENCE EXAMPLE 3

The same active alumina as used in Example 2 was immersed for 20 minutes in an aqueous soluton of palladium chloride, acidified with hydrochloric acid, containing 1 g/l of palladium, and the excess solution was removed. The carrier was then treated with an aqueous solution containing 2 g/l of $NaBH_4$, washed repeatedly with water, dried at 120° C, and heat-treated at 600° C for 30 minutes to obtain the catalyst F.

REFERENCE EXAMPLE 4

The same active alumina as used in Example 2 was heat-treated at 1100° C for 2 hours. Then, the carrier was immersed for 20 minutes in an aqueous solution of palladium chloride, and acidified with hydrochloric acid containing 1 g/l of palladium. The excess solution was removed and the carrier was treated with an aqueous solution containing 2 g/l of $NaBH_4$, washed repeatedly with water, dried at 120° C and heat-treated at 600° C for 30 minutes to obtain the catalyst G.

EXAMPLE 4

The thickness of the iron compound-containing layer and the results of the measurements of the palladium component carrying layer with respect to catalysts A, D and E are shown in Table 3.

TABLE 3

| Catalyst | Iron-containing layer Thickness (μ) (Mean value in parentheses) | Palladium containing layer Thickness (μ) (Mean value in parentheses) |
|---|---|---|
| A | 70 – 190 (120) | 160 – 240 (200) |
| D | 70 – 160 (120) | 120 – 200 (160) |
| E | 20 – 90 ( 50) | 110 – 200 (140) |

As evident from Table 3, each catalyst has differences in the thickness of the iron compound-containing layer and the palladium component carrying layer, but from the viewpoint of the mean value, the thickness of the palladium component carrying layer is greater than that of the iron compound-containing layer. This shows that palladium component has penetrated more deeply than the iron compound-containing layer. The relationship between the iron compound-containing layer and the palladium component carrying layer is shown schematically in FIG. 2.

Figure 2:
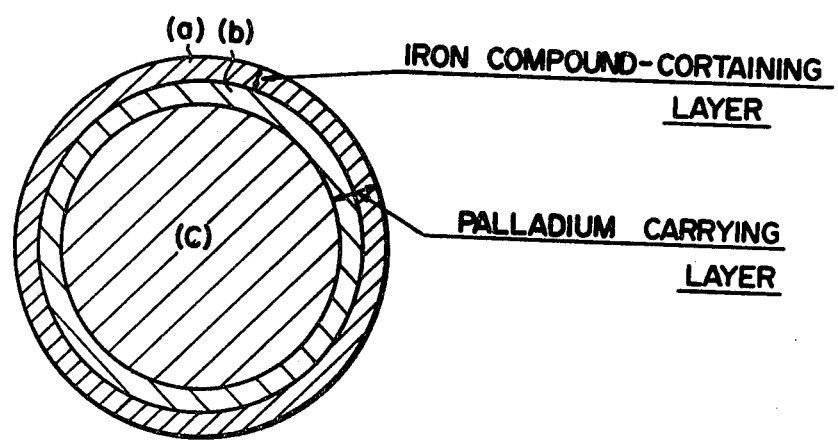
FIG. 2 is a sketch illustrating the relationship between the iron compound-containing layer and the palladium-carrying layer of the present catalyst.

As shown in FIG. 2, the palladium component carrying layer overlaps the iron compound-containing layer $a$ and further extends to the layer $b$.

The layer $a$ which contains the iron compound has pores of larger diameters than the pores in the layers $b$ and $c$, which are deeper than the layer $a$, and the layer $b$ has middle-sized pores of diameters intermediate in size between those of the layer $a$ and $c$. For instance, the pore diameters obtained from the pore size distribution curves for the layers $a$, $b$ and $c$ of catalyst D at an integrated pore volume ratio of 50% were 0.14μ for layer $a$, 0.11μ for layer $b$ (sample carriers partially containing the layers $a$ and $b$ were used for measurements) and 0.09μ for layer $c$.

EXAMPLE 5

Catalysts D and E obtained in Examples 2 and 3 and comparative catalysts F and G were subjected to the accelerated catalyst poison resistance test. Results of the propane-oxidizing and CO-oxidizing test conducted before and after the accelerated catalyst poison resistance test are shown in Table 4.

The Fe content and Pd content of the carriers used in Reference Examples as the above are tabulated in Table 5.

TABLE 5

| Catalyst | Fe content (%) | Pd content (%) |
|---|---|---|
| A | 0.13 | 0.17 |
| B | — | 0.17 |
| C | 3.2 | 0.17 |
| D | 0.18 | 0.12 |
| E | 0.12 | 0.12 |
| F | — | 0.12 |
| G | — | 0.12 |

TABLE 4

| Catalyst | Propane conversion % | | CO conversion % | |
| --- | --- | --- | --- | --- |
| | Before poison resistance test | After poison resistance test | Before poison resistance test | After poison resistance test |
| Catalyst D | 97 | 69 | 99 | 97 |
| Catalyst E | 99 | 63 | 99 | 97 |
| Catalyst F | 95 | 30 | 99 | 32 |
| Catalyst G | 97 | 34 | 99 | 42 |

From the results shown in Table 4, it is clear that the catalysts D and E of this invention show a substantial improvement over comparative catalysts F and G with respect to the propane conversion and CO purifying ratio after the accelerated catalyst poison resistance test.

What is claimed is:

1. A catalyst for purifying exhaust gases, which comprises a catalyst carrier composed at least mainly of alumina, which has an α-alumina layer near the surface of the carrier said α alumina, layer having a larger pore diameter than the interior portion of said carrier under said layer, said carrier being impregnated with an active catalytic component for purifying exhaust gases which extends more deeply into the carrier than said α-alumina layer.

2. The catalyst of claim 1, wherein Fe is used to increase the pore diameter of the said alumina layer.

3. The catalyst of claim 1, wherein the layer having a larger pore diameter has a thickness of up to 260μ.

4. The catalyst of claim 1, wherein the active catalytic component with which the carrier is impregnated comprises palladium.

5. The catalyst of claim 4, wherein the active catalytic component is selected from the group consisting of palladium halides, mineral acid salts containing Pd, palladium with ammonium, salts palladium with amine salts and organic acid salts containing palladium.

6. The method of making a catalyst for treating exhaust gases which comprises the step of increasing the pore size of the outer layer of a carrier consisting mainly of alumina relative to the pore size of the inner part of said carrier by converting the outer layer to α-alumina and impregnating said carrier with an active catalytic component for purifying exhaust gases to a depth greater than that of said layer.

7. The method of claim 6, wherein the conversion of alumina to α-alumina is effected by adding to the carrier a compound for promoting the conversion of alumina to α-alumina selected from the group consisting of oxides of Cr, Mn, Fe, Mo and Co and heat-treating the alumina carrier.

8. The catalyst of claim 7, wherein an iron compound is used as the compound promoting the conversion of alumina to α-alumina.

9. The catalyst of claim 5, in which said catalytic component is palladium chloride acidified with hydrochloric acid.

10. The catalyst of claim 5, in which said catalytic component is palladium nitrate acidified with nitric acid.

* * * * *

UNITED STATES PATENT AND TRADEMARK OFFICE
CERTIFICATE OF CORRECTION

PATENT NO. : 4,102,813

DATED : July 25, 1978

INVENTOR(S) : SADAHIRO KIMURA et al

It is certified that error appears in the above-identified patent and that said Letters Patent are hereby corrected as shown below:

[30] Foreign Application Priority Data

Apr. 22, 1974    [JP] Japan................ 49-045290

Signed and Sealed this

Sixth Day of March 1979

[SEAL]

Attest:

RUTH C. MASON
*Attesting Officer*

DONALD W. BANNER
*Commissioner of Patents and Trademarks*